(12) United States Patent
Kling et al.

(10) Patent No.: US 10,472,049 B2
(45) Date of Patent: Nov. 12, 2019

(54) BONDED MOUNT RING SPINNER

(71) Applicant: United Technologies Corporation, Hartford, CT (US)

(72) Inventors: Colin J. Kling, Middletown, CT (US); Scot A. Webb, Gale Ferry, CT (US); James J. McPhail, New London, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 449 days.

(21) Appl. No.: 15/030,787

(22) PCT Filed: May 23, 2014

(86) PCT No.: PCT/US2014/039323
§ 371 (c)(1),
(2) Date: Apr. 20, 2016

(87) PCT Pub. No.: WO2015/060901
PCT Pub. Date: Apr. 30, 2015

(65) Prior Publication Data
US 2016/0288902 A1    Oct. 6, 2016

Related U.S. Application Data

(60) Provisional application No. 61/893,648, filed on Oct. 21, 2013.

(51) Int. Cl.
*B64C 11/14*   (2006.01)
*F02C 3/04*    (2006.01)

(52) U.S. Cl.
CPC ............... *B64C 11/14* (2013.01); *F02C 3/04* (2013.01); *F05D 2220/36* (2013.01)

(58) Field of Classification Search
CPC . B64C 11/14; F01D 5/066; F02C 3/04; F05D 2220/36; F05D 2230/23; Y02T 50/672
See application file for complete search history.

(56) References Cited

U.S. PATENT DOCUMENTS 4,363,604 A * 12/1982 Broberg, Jr. ............ B64C 11/14
403/348
4,393,650 A    7/1983 Pool
(Continued)

OTHER PUBLICATIONS

European Search Report for Application No. EP 14 85 5237.
(Continued)

*Primary Examiner* — Jesse S Bogue
(74) *Attorney, Agent, or Firm* — Cantor Colburn LLP

(57) ABSTRACT

A fan assembly of a gas turbine engine, a method for fabricating a fan assembly for a gas turbine engine, and a gas turbine engine are disclosed. The fan assembly of the gas turbine engine may include a spinner section, a fan hub section aft of the spinner section, and a joint therebetween. The fan assembly may further include a support ring for internally supporting the spinner, the support ring including a first portion facing the fan hub and a second portion connected to the spinner at the joint, wherein the connection between the second portion and the joint is a bonded connection.

13 Claims, 5 Drawing Sheets

(56) References Cited

U.S. PATENT DOCUMENTS

| | | | | |
|---|---|---|---|---|
| 4,699,568 A * | 10/1987 | Harlamert | ............... | B64D 15/12 |
| | | | | 416/155 |
| 5,252,160 A * | 10/1993 | Scanlon | ................. | B29C 33/02 |
| | | | | 156/196 |
| 5,833,435 A * | 11/1998 | Smith | ....................... | F02C 7/04 |
| | | | | 416/94 |
| 9,410,431 B2 * | 8/2016 | Bottome | ................. | F01D 5/066 |
| 2005/0231052 A1 | 10/2005 | Rockarts et al. | | |
| 2006/0216143 A1* | 9/2006 | Trinks | ....................... | F01D 9/04 |
| | | | | 415/173.1 |
| 2010/0226786 A1 | 9/2010 | Mahan | | |
| 2011/0236217 A1 | 9/2011 | Bottome | | |
| 2013/0087955 A1 | 4/2013 | Planter et al. | | |
| 2014/0199176 A1* | 7/2014 | Tomeo | .................... | B23P 15/04 |
| | | | | 416/245 R |
| 2014/0255202 A1* | 9/2014 | Kling | ....................... | F02C 7/05 |
| | | | | 416/245 R |

OTHER PUBLICATIONS

International Search Report for International Application No. PCT/US2014/039323; dated Oct. 27, 2014.
Written Opinion for International Application No. PCT/US2014/039323; dated Oct. 27, 2014.

\* cited by examiner

BONDED MOUNT RING SPINNER

TECHNICAL FIELD OF THE DISCLOSURE

The present disclosure relates to gas turbine engines, and more particularly, to a spinner for a fan section of a gas turbine engine, the spinner having a support ring.

BACKGROUND OF THE DISCLOSURE

In a gas turbine engine, the spinner or nosecone of the fan section is designed to direct local flow into the root of the fan blades. The spinner or nosecone may be designed to minimize foreign object damage, such as impact forces caused by hail and bird strikes. Additionally, the spinner or nosecone may be designed to minimize bill of material object damage, which is damage caused by components of the engine itself. Per FAA regulations, the gas turbine engine must be designed to meet given continued operation requirements after foreign object strikes to the fan, including the spinner or nosecone. Additionally, increased durability of the gas turbine engine and the spinner or nosecone itself is beneficial to the owner because the reduced wear and tear on the engine may contribute to lower repair costs and greater efficiency.

As such, a spinner of the fan section of the gas turbine engine may be designed with a support flange (e.g., a Y-flange) aft of the nose of the spinner. The support flange may transfer axial compressive forces from strikes to the spinner, transfer shear forces due to rotational acceleration and deceleration, and/or may transfer radial forces imparted due to thermal and/or centrifugal expansion. Said support flange may be located between the spinner of the fan section and a fan hub of the fan section.

Support flanges on prior fan spinners are a part of the spinner itself, wherein the spinner and support flange are fabricated as one component. Prior fan spinners may consist of a two dimensional composite laminate construction. The support flange exists on the spinner at an aft area where the laminate splits and one portion continues aft, forming the flow path to the fan platforms while another portion dives radially inboard and creates the mounting flange to the hub.

Current gas turbine engine components, such as a spinner for the fan section, may be formed by injection molding. Injection molding is an attractive means of forming components because the process may reduce the cost of production of such components. However, current injection molding tools, generally, require the tool to split into at least two pieces to release the created component. To create a spinner component by injection molding, the spinner component would be split normal to the axis of revolution. The support flanges on prior spinners consist of an overhung portion, creating a spinner having geometry that would be inherently locked onto the molding tool. The lock-on condition caused by the aft support flange would prevent a spinner with an integral support flange from being fabricated by injection molding.

To enable the use of an injection molded spinner, a need exists to fabricate a spinner component having a support comparable to the prior art integral support flange, wherein the support is not fabricated as a part of the base spinner itself, but rather, as a separate component to be bonded to the aft portion of the spinner.

SUMMARY OF THE DISCLOSURE

In accordance with one aspect of the disclosure, a fan assembly of a gas turbine engine is disclosed. The fan assembly may include a spinner, a fan hub aft of the spinner, and a joint therebetween. The fan assembly may include a support ring for internally supporting the spinner, the support ring including a first portion facing the fan hub and a second portion connected to the spinner at the joint, wherein the connection between the second portion and the joint is a bonded connection.

In a refinement, the joint may include an axial stop.

In a refinement, the joint may include a radial snap.

In a refinement, the fan assembly may include a mating key at the joint.

In a further refinement, the support ring may further include a mating slot to accept the mating key at the joint.

In another refinement, the fan assembly may include bond rails at the joint.

In a refinement, the second portion of the support ring may be bonded by epoxy to the spinner at the joint.

In a refinement, the second portion may be bonded by silicone adhesive to the spinner at the joint.

In accordance with another aspect of the disclosure, a method for fabricating a fan assembly for a gas turbine engine is disclosed. The fan assembly may include a spinner, a fan hub aft of the spinner, and a joint therebetween. The disclosed method may include forming the spinner and forming a support ring for internally supporting the spinner including a first portion to face the fan hub and a second portion to face the spinner. The method further may include bonding the second portion of the support ring to the spinner section at the joint.

In a refinement, the spinner may be formed by injection molding.

In a refinement, the support ring may be formed by injection molding.

In a refinement, the method may further include forming bonding rails at the joint.

In a further refinement, the method may include sizing the bonding rails to constrain a thickness of a bond bonding the second portion of the support ring to the spinner at the joint.

In another further refinement, the method may include sizing the bonding rails to create a bond thickness capable of bearing stress associated with a flight cycle.

In accordance with another aspect of the disclosure, a gas turbine engine is disclosed. The gas turbine engine includes a fan assembly section, a compressor section downstream of the fan assembly section, a combustor section downstream of the compressor section, and a turbine section downstream of the combustor section. The fan assembly section may a spinner, a fan hub aft of the spinner, and a joint therebetween. The fan assembly section may also include a support ring for internally supporting the spinner including a first portion facing the fan hub and a second portion connected to the spinner at the joint, wherein the connection between the second portion and the joint is a bonded connection.

In a refinement, the joint may further include an axial stop, the axial stop transferring axial compressive forces associated with the gas turbine engine to the support ring.

In a refinement, the joint may further comprise a radial snap, the radial snap transferring radial forces associated with the gas turbine engine to the support ring.

In a refinement, the fan assembly may include a mating key at the joint.

In a further refinement, the support ring may further include a mating slot to accept the mating key at the joint.

In yet a further refinement, the mating key and the mating slot may transfer shear forces associated with the gas turbine engine to the support ring.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE DISCLOSURE

Figure 1:
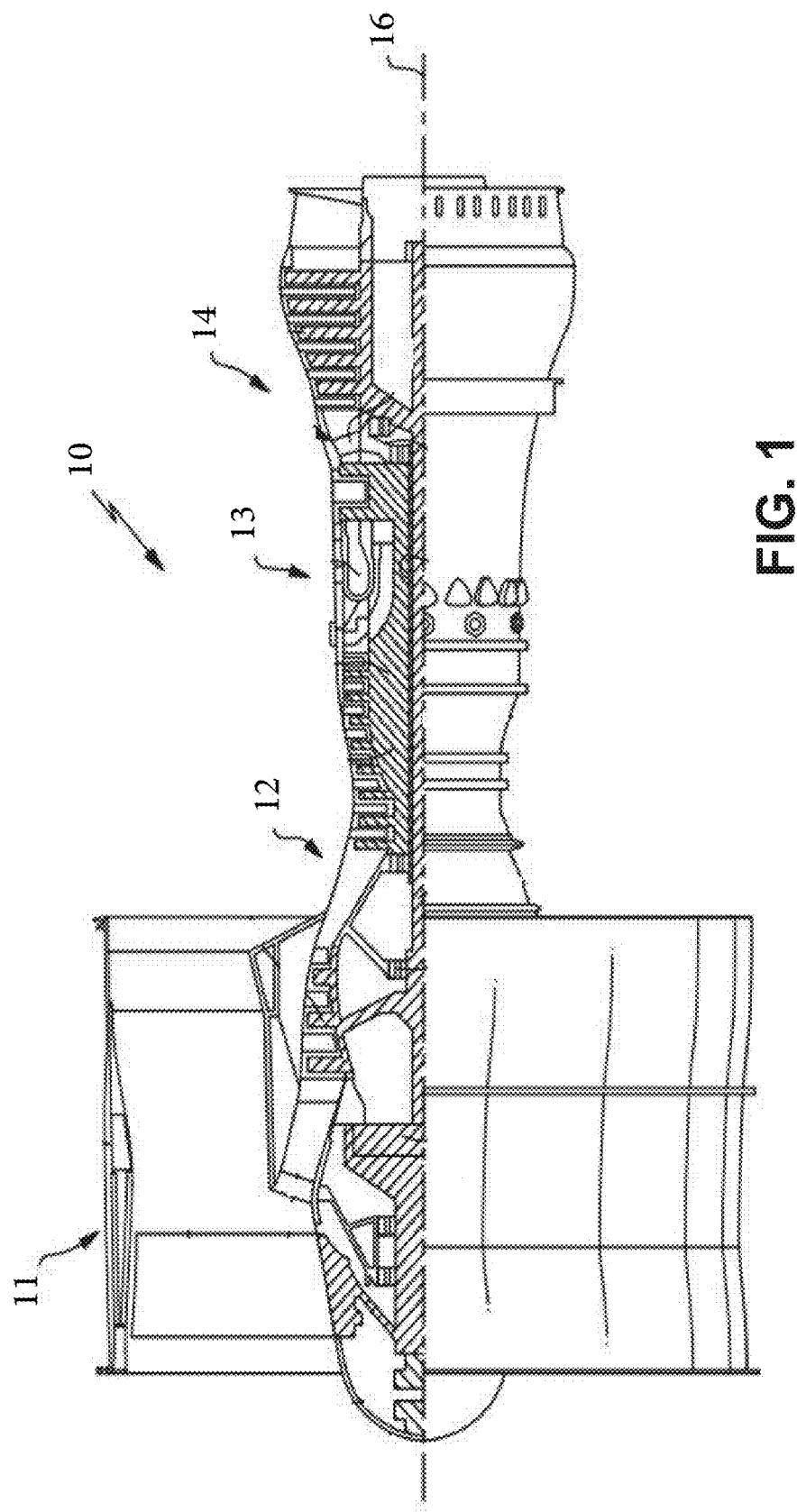
FIG. 1 is a cross-sectional view of a gas turbine engine constructed in accordance with the present disclosure.

Referring to the drawings, and with specific reference to FIG. 1, a gas turbine engine constructed in accordance with the present disclosure is generally referred to by reference numeral 10. Such a gas turbine engine 10 can be used for any number of different applications including, but not limited to, generation of aircraft thrust and land-based power. Moreover, it is to be understood that the sectional view provided in FIG. 1 is included simply to provide a basic understanding of the various sections in a gas turbine engine, and not to limit the invention thereto. The present disclosure extends to all types of gas turbine engines used in all types of applications.

The gas turbine engine 10 may have a fan section 11 including a spinner 15, the fan section 11 drawing in ambient air and directing the ambient air to a compressor section 12. The incoming air is greatly compressed by the compressor section 12 and directed to a combustor section 13 where it is mixed with fuel and combusted. The products of that combustion, in the form of very hot and expanding gases, are directed to a turbine section 14 shown to be downstream of the combustor section 13. The turbine section 14 and/or compressor section 12 may each be comprised of a plurality of blades radially extending from a shaft forming rotating sections or rotors. A plurality of vanes may radially extend inwardly from a static section or stator, and are intermeshed with the plurality of blades. In so doing, it can be seen that the turbine section 14, compressor section 12, spinner 15 and fan 11 all revolve around a central engine axis 16.

Figure 2:
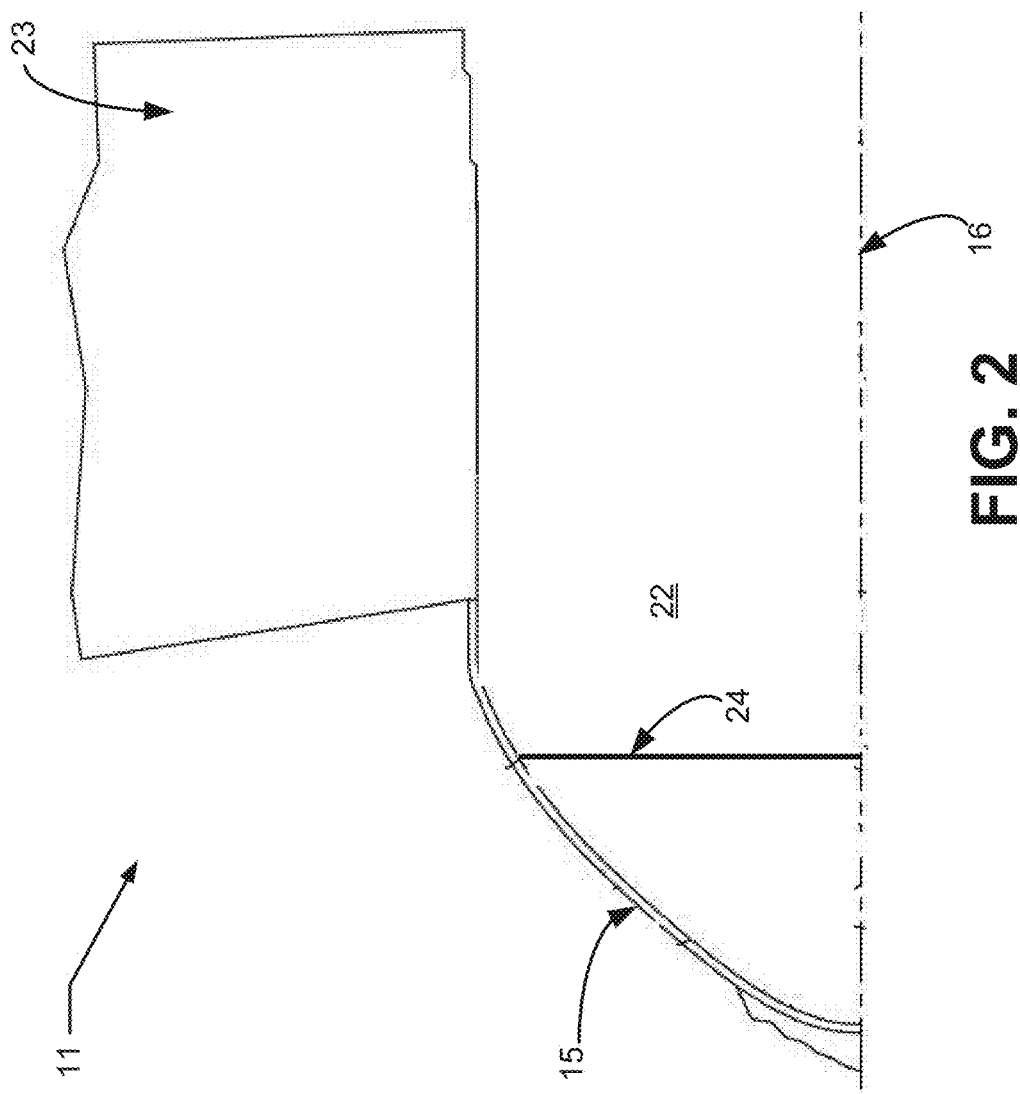
FIG. 2 is a cross-sectional view of a fan and a fan spinner of the gas turbine engine of FIG. 1 constructed in accordance with the present disclosure.

Further, FIG. 2 illustrates a cross-sectional view of a fan section 11 of the gas turbine engine 10 of FIG. 1. The fan section 11 includes a series of radially extending fan blades 23. At the forward-most portion of the fan section is the spinner 15, which may be operatively associated with an aft fan hub section 22. The spinner 15 may be replaced with a nosecone. A support ring 24 may be included aft of the spinner 15 and adjacent to the fan hub section 22. The support ring 24 may be a solid component extending radially and covering the entire radial area of the interior of the aft end of the spinner 24. Further, the support ring 24 may be scalloped, meaning that it may have some materials removed. Scalloping the support ring 24 may allow for a lighter-weight support ring 24.

The spinner 15 and the support ring 24 may be separate elements individually fabricated to be combined on construction of the fan section 11 and/or the gas turbine engine 10 itself. The spinner 15 and/or the support ring 24 may be fabricated individually by an injection molding process. Such injection molding processes may include injecting a molding material into a mold shaped in the form of the spinner 15 and/or the support ring 24. The molding material may be a filled composite containing, for example, plastics mixed with chopped carbon fibers and/or fiber glass.

Figure 3:
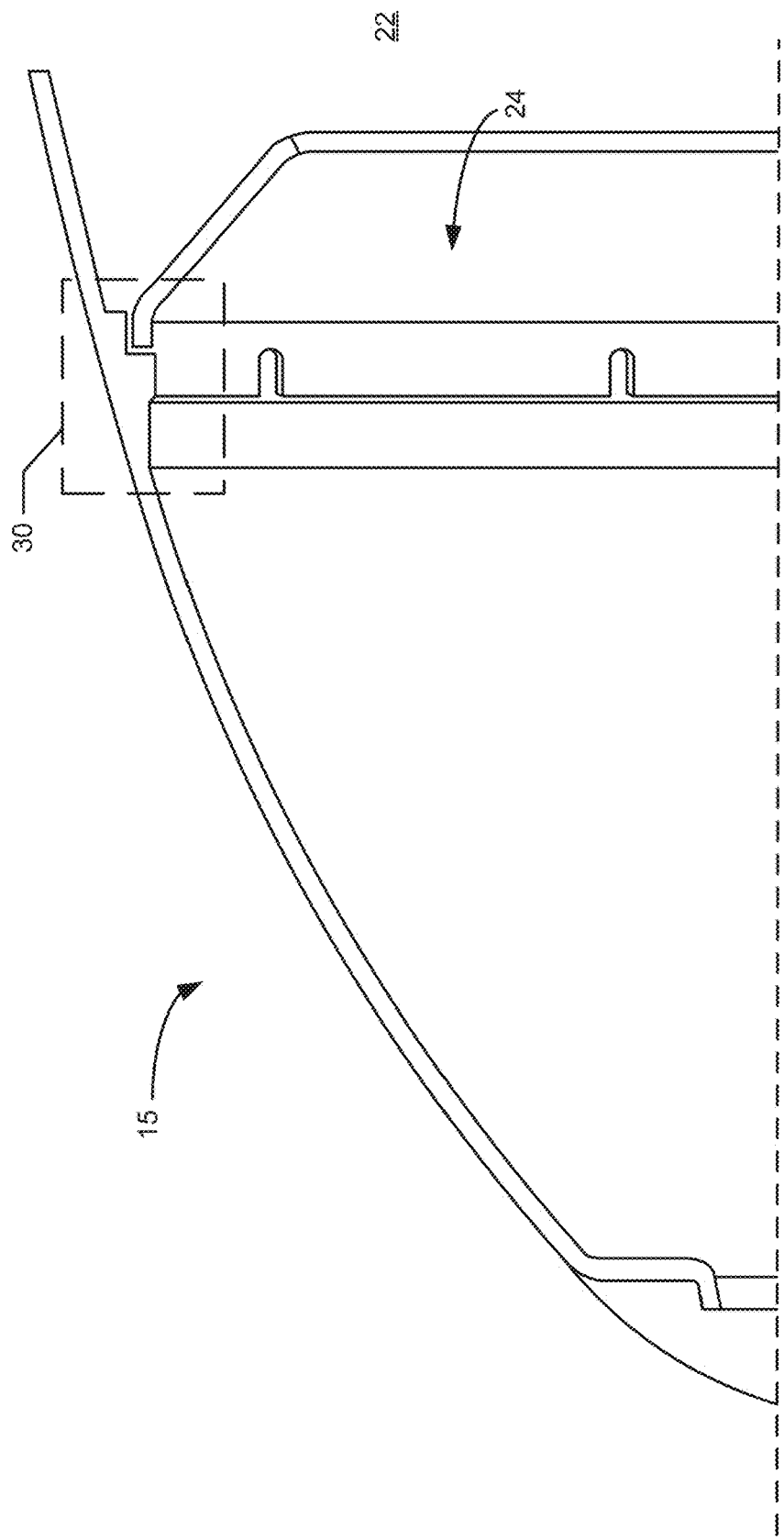
FIG. 3 is a cross-sectional view of a portion of a fan spinner of FIG. 2, wherein the fan spinner includes a bonded support ring.
Figure 4:
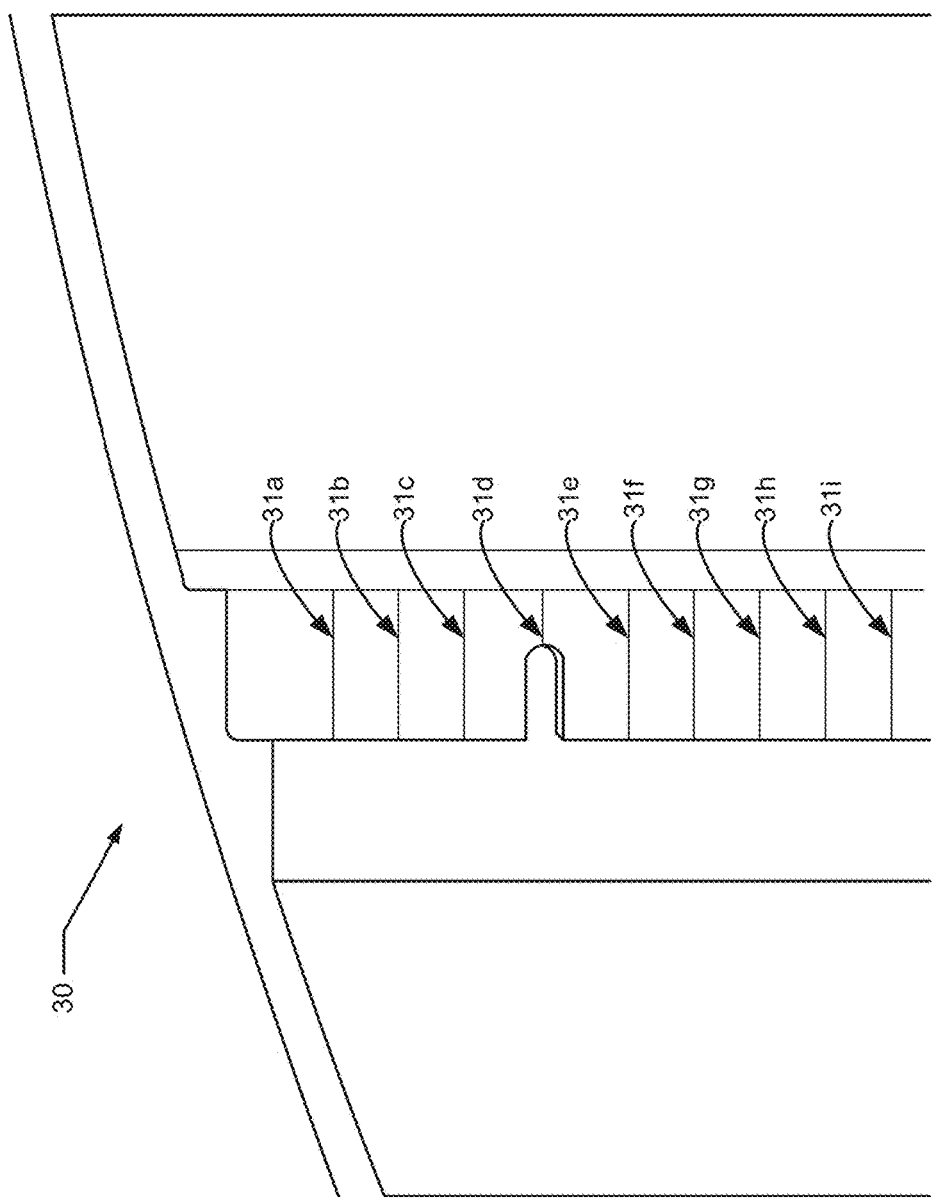
FIG. 4 is a cross-sectional view of a bonding joint of the fan spinner of FIGS. 2 and/or 3.

The support ring 24 may interface with the fan hub section 22 on its interior diameter (aft) and interface with the spinner 15 on its outer diameter (forward). As seen in the further detailed, cross-sectional view of the spinner 15 in FIG. 3, the support ring 24 is located aft of the spinner 15 at a bonding joint 30 between the spinner and the fan hub section 22. The bonding joint 30 is a location in which the aft support ring 24 and the spinner 15 may be bonded upon construction of the fan section 11. The support ring 24 and the spinner 15 may be bonded using any bonding agent such as an epoxy, a silicone adhesive, and/or any suitable means for bonding at the bonding joint 30. As seen in FIG. 4, a cross-sectional view of the bonding joint 30 wherein the support ring 24 is removed, the bonding joint may include one or more bonding rails 31. The bonding rails 31 may be a set of rails 31, including plural individual rails 31a, 31b, etc. The bonding rails 31 may be designed to control the thickness of a bond created by a bonding agent. Additionally or alternatively, the bonding rails 31 may be sized such that they may properly bear radial stress throughout a flight cycle of the gas turbine engine 10.

Figure 5:
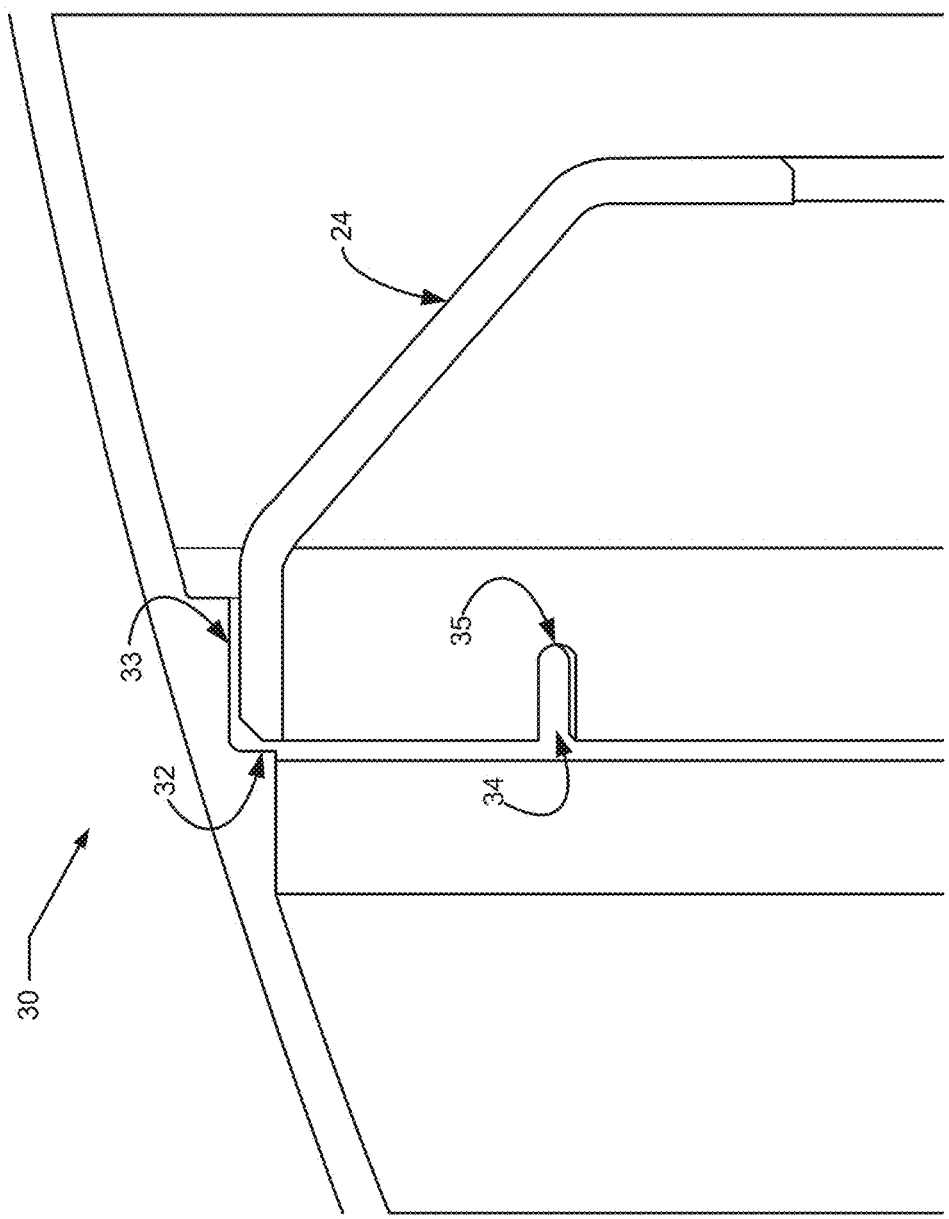
FIG. 5 is a cross-sectional view of the fan spinner of FIG. 3, wherein the bonded support ring is not present.

When in operative association with the bonding joint 30, the support ring 24 may be designed to transfer axial compressive and tensile forces, rotational shear forces, and radial compressive forces. FIG. 5 illustrates the bonding joint 30 in a magnified, cross-sectional view. The bonding joint may include an axial stop 32, which, when abutted with the support ring 24, may transfer axial compressive forces from the spinner 15 to the support ring 24. Such axial compressive forces may be caused by foreign object damage (e.g., bird strikes), complications upon installation, and/or any other pressures on the spinner 15 in the axial direction. Additionally, the bonding joint 30 may include a radial snap 33, which, when abutted with the support ring 24, may transfer radial forces imparted upon the spinner 15 to the support ring. Specifically, the radial forces may be caused by thermal and/or centrifugal expansion.

The bonding joint 30 may include one or more mating keys 34 and the support ring 24 may include one or more correlated mating slots 35. The mating keys 34 may be designed to fit the size and shape of the mating slots 35 in a male/female, locking manner. When the support ring 24 is to be attached to the spinner 15, the mating keys 34 and mating slots 35 may be aligned and positioned in a locking manner. The mating keys 34 and the mating slots 35, in combination, may transfer shear forces impacting the spinner 15 to the support ring. Such shear forces may be present due to rotational acceleration and/or deceleration of the gas turbine engine 10. While the present example shows the mating keys 34 associated with the bonding joint 30 and the mating slots 35 are associated with the support ring 24, alternatively, mating keys associated with the support ring 24 and the mating slots are associated with the bonding joint. The bonded joint enables the support ring to be separate from the spinner and maintain the disclosed interfaces, simultaneously allowing the spinner to be manufactured in two pieces and, thus, injection molded.

INDUSTRIAL APPLICABILITY

From the foregoing, it can be seen that the technology disclosed herein has industrial applicability in a variety of settings such as, but not limited to, bonded support rings for a fan spinner of a gas turbine engine. The gas turbine engine may be used in conjunction with an aircraft for generating thrust, or for land-based applications for generating power. The teachings of the present disclosure, may provide protection to the engine from axial compressive forces, shear forces, radial forces, and/or any other wear and tear on the fan section of a gas turbine engine or the gas turbine engine as a whole while allowing for use of a fan spinner having multiply fabricated parts. Creating a fan spinner having multiply fabricated parts allows for the parts to be fabricated by injection molding. Because injection molding may be a less costly means of fabricating components of the gas turbine engine, this improvement over the prior art may save costs due to the use of injection molding while still adhering to prescribed standards of durability and operability based on FAA regulation and consumer good-will.

While the present disclosure has been in reference to a gas turbine engine and an aircraft, one skilled in the art will understand that the teachings herein can be used in other applications as well. It is therefore intended that the scope of the invention not be limited by the embodiments presented herein as the best mode for carrying out the invention, but that the invention will include all equivalents falling within the spirit and scope of the claims as well.

What is claimed is:

1. A fan assembly, for a gas turbine engine, comprising:
   a spinner, a fan hub aft of the spinner, and a joint therebetween;
   a support ring for internally supporting the spinner including a first portion facing the fan hub and a second portion connected to the spinner at the joint, wherein the connection between the second portion and the joint is a bonded connection and the assembly further comprises bond rails at the joint sized to bear radial stresses throughout a flight cycle of the gas turbine engine.

2. The fan assembly of claim 1, wherein the joint comprises an axial stop.

3. The fan assembly of claim 1, wherein the joint comprises a radial snap.

4. The fan assembly of claim 1, further comprising a mating key at the joint.

5. The fan assembly of claim 4, wherein the support ring further comprises a mating slot to accept the mating key at the joint.

6. The fan assembly of claim 1, wherein the second portion of the support ring is bonded by epoxy to the spinner section at the joint.

7. The fan assembly of claim 1, wherein the second portion of the support ring is bonded by silicone adhesive to the spinner at the bonding joint.

8. A gas turbine engine, comprising:
   a fan assembly section, the fan assembly section comprising:
   a spinner, a fan hub aft of the spinner, and a joint therebetween;
   a support ring for internally supporting the spinner including a first portion facing the fan hub and a second portion connected to the spinner at the joint, wherein the connection between the second portion and the joint is a bonded connection and the assembly further comprises bond rails at the joint sized to bear radial stresses throughout a flight cycle of the gas turbine engine;
   a compressor section downstream of the fan assembly section;
   a combustor section downstream of the compressor section; and
   a turbine section downstream of the combustor section.

9. The gas turbine engine of claim 8, wherein the joint further comprises an axial stop, the axial stop transferring axial compressive forces associated with the gas turbine engine to the support ring.

10. The gas turbine engine of claim 8, wherein the joint further comprises a radial snap, the radial snap transferring radial forces associated with the gas turbine engine to the support ring.

11. The gas turbine engine of claim 8, wherein the fan assembly section further comprises a mating key at the joint.

12. The gas turbine engine of claim 11, wherein the support ring further comprises a mating slot to accept the mating key at the joint.

13. The gas turbine engine of claim 12, wherein the mating key and the mating slot, in combination, transfer shear forces associated with the gas turbine engine to the support ring.

* * * * *